D. GOODWILLIE.
Egg-Carrier.
No. 226,168  Patented April 6, 1880.
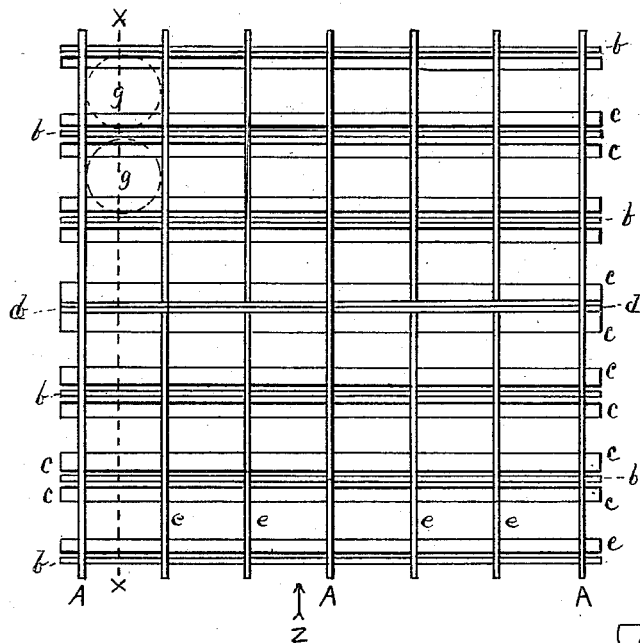
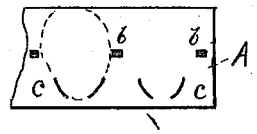
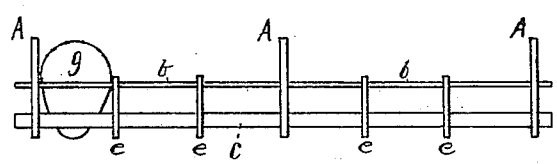
WITNESSES.
Arthur G. Morey.
C. J. Morey.
INVENTOR.
David Goodwillie
By J. L. Chapin
Atty.

United States Patent Office.

DAVID GOODWILLIE, OF CHICAGO, ILLINOIS.

EGG-CARRIER.

SPECIFICATION forming part of Letters Patent No. 226,168, dated April 6, 1880.

Application filed August 13, 1879.

*To all whom it may concern:*

Be it known that I, DAVID GOODWILLIE, of Chicago, in the county of Cook and State of Illinois, have invented a new and useful Improvement in Egg-Carriers, of which the following is a specification, reference being had to the accompanying drawings illustrating the invention.

The present invention is an improvement on the egg-carrier patented to me on August 26, 1879, No. 218,813; and its nature consists in substituting for the lower supporting-rods curved or flat thin strips of wood to sustain the eggs.

The advantage of these strips over the rods is, that the rods, being round, will sag down and in a measure lose their elasticity, while the thin strips tend to spring more laterally, and thus form easy seats for the eggs. I desire at the same time to have a free ventilation vertically, and at least in one direction horizontally, through the trays.

The nests or egg-receptacles should be open that the light may not be obstructed in testing the condition of the eggs, a free circulation of air among the eggs being essential in preventing decomposition.

In the respects stated my egg-carrier differs materially from the devices shown and described in Reissue Letters Patent to E. P. Herrick, dated March 31, 1874, No. 5,814, which consist in solid vertical ends and solid curved sides, terminating at their lower edges in tight bottoms, making the inspection of the condition of the eggs in the trays an impossibility, and preventing that elasticity and ventilation essentially necessary to the safe transit of eggs.

My egg-carrier also differs from the devices patented to Mitchell and Barnett on January 13, 1874, inasmuch as in the latter device there is no space between the inclined egg-seat and the support for the larger portion of the egg for the passage of air, and not enough space horizontally open to permit of a proper inspection of the eggs by light. The inclined and vertical parts forming opposite sides of the cells in this patent unite by an obtuse angle, and are therefore practically non-elastic as an egg-carrier.

In the drawings, Figure 1 is a top or plan view of one tray of an egg-carrier embodying my improvement; Fig. 2, a sectional elevation taken on line $x\ x$, Fig. 1; Fig. 3, an end elevation looking in the direction of dart $z$, Fig. 1. Fig. 4 shows a broken elevation of one of the narrower strips with curved mortises corresponding to the form of the eggs.

A A A represent the sides and middle strips of the tray, and $e\ e\ e\ e$ the partition-strips between them.

The object of making the strips A wider than the strips $e$ is that a rod, $d$, put through strips A to serve as a handle to move the tray, may have a position far enough above the strips $e$ for the fingers of the hand to pass between without the liability of breaking the eggs; but this is not considered new.

The invention consists in the thin strips of wood or other material, $c$, put through the strips A $e$ on such an inclination as will give to the eggs $g$ considerable bearing-surface, as shown, and wholly detached from the upper supports, and of such widths as will leave a suitable space between the upper supports and strips and between the strips at the bottom of the nest to permit a free circulation of air vertically and horizontally and permit of exposing the eggs horizontally to sufficient light to test their condition. If the strips are made of thin strong wood they will bend between the strips or partitions A $e$ and conform to the eggs of different contours, although the strips be flat. Yet, to hold the strips $c$ in place by friction, I prefer to mortise the holes through the partitions in the form of segments, as shown at Fig. 4, so that when the strips $c$ are drawn through the mortises they will be curved in transverse section, care being taken not to curve the strips more than to fit the eggs.

I find that the thin strips furnish a more yielding surface, and, from experiments made in transporting eggs over rough roads in these trays, I am satisfied, as no breakage occurred, that the device and improvement are of great public utility and advantage in safely handling eggs and fruits.

I therefore claim as new and desire to secure by Letters Patent—

In a tray for carrying eggs, the thin flat or curved strips c, set apart from the upper supporting-rods to admit light from below and a current of air longitudinally through the tray, and placed on inclines, as shown, and made so thin that their inner surfaces will be adjusted to the contours of different-sized eggs, as specified.

DAVID GOODWILLIE.

Witnesses:
G. L. CHAPIN,
A. G. MOREY.